(12) United States Patent
Guenst et al.

(10) Patent No.: US 10,874,206 B2
(45) Date of Patent: Dec. 29, 2020

(54) ORAL CLEANING SYSTEM

(71) Applicant: ToothShower, LLC, Collegeville, PA (US)

(72) Inventors: Lisa Michelle Guenst, Collegeville, PA (US); Jeremy Mark Fallis, Jr., Lansdale, PA (US); Marshal Lyndon Chang, Philadelphia, PA (US)

(73) Assignee: Toothshower, LLC, Collegeville, PA (US)

( * ) Notice: Subject to any disclaimer, the term of this patent is extended or adjusted under 35 U.S.C. 154(b) by 38 days.

(21) Appl. No.: 16/299,518

(22) Filed: Mar. 12, 2019

(65) Prior Publication Data
US 2019/0298051 A1 Oct. 3, 2019

Related U.S. Application Data

(60) Provisional application No. 62/651,313, filed on Apr. 2, 2018, provisional application No. 62/777,913, filed on Dec. 11, 2018.

(51) Int. Cl.
A46B 9/04 (2006.01)
A46B 11/06 (2006.01)
(Continued)

(52) U.S. Cl.
CPC ............ *A46B 9/045* (2013.01); *A46B 5/0012* (2013.01); *A46B 5/0037* (2013.01);
(Continued)

(58) Field of Classification Search
CPC ....... A46B 5/0012; A46B 9/045; A46B 11/06; A46B 11/063; A61C 17/02; A61C 17/0202; A61C 17/032
(Continued)

(56) References Cited

U.S. PATENT DOCUMENTS 683,075 A 9/1901 Schneider
803,475 A 10/1905 Dennis
(Continued)

FOREIGN PATENT DOCUMENTS

CN 2536202 Y 2/2003
EP 0258512 A1 3/1988
(Continued)

OTHER PUBLICATIONS

International Search Report from PCT Application No. PCT/US2017/067792, dated Apr. 16, 2018.
(Continued)

*Primary Examiner* — Randall E Chin
(74) *Attorney, Agent, or Firm* — Workman Nydegger

(57) ABSTRACT

An oral cleaning system includes a toothbrush body with a first stem. The first stem has a rigid configuration and a first head with a first plurality of bristles. A channel is defined within the first stem and at least one fluid outlet is defined in the first head. The at least one fluid outlet is in fluid communication with the channel and is configured to facilitate irrigation of a mouth or teeth via the first head. A second stem is connected to the first stem and extends upwardly and outwardly from a distal portion of the first stem. The second stem includes a second plurality of bristles and is generally opposed and spaced from the first head. The second stem has a semi-flexible configuration such that the second head is resiliently movable inwardly or outwardly relative to the first head without substantially bending the first stem.

20 Claims, 3 Drawing Sheets

(51) Int. Cl.
*A61C 17/02* (2006.01)
*A46B 5/00* (2006.01)
*A46B 9/00* (2006.01)

(52) U.S. Cl.
CPC .......... *A46B 5/0066* (2013.01); *A46B 5/0095* (2013.01); *A46B 9/005* (2013.01); *A46B 11/063* (2013.01); *A61C 17/0202* (2013.01); *A46B 2200/1066* (2013.01)

(58) Field of Classification Search
USPC ........................................................ 15/167.2
See application file for complete search history.

(56) References Cited

U.S. PATENT DOCUMENTS

| | | | |
|---|---|---|---|
| 1,500,107 A | 7/1924 | Chandler | |
| 1,646,942 A | 10/1927 | Tuorto | |
| 1,868,368 A | 7/1932 | Reese | |
| 2,672,143 A | 3/1954 | Gold et al. | |
| 3,379,192 A | 4/1968 | Warren, Jr. | |
| 3,424,156 A | 1/1969 | Smith | |
| 3,468,306 A | 9/1969 | Heitzman | |
| 3,480,008 A | 11/1969 | Chao | |
| 3,481,329 A | 12/1969 | Warren, Jr. | |
| 3,489,141 A | 1/1970 | Warren, Jr. | |
| 3,504,666 A | 4/1970 | Vireno | |
| 3,509,874 A | 5/1970 | Stillman | |
| 3,516,402 A | 6/1970 | Toth | |
| 3,527,218 A | 9/1970 | Westine | |
| 3,535,047 A * | 10/1970 | Vireno | A46B 11/063 401/10 |
| 3,537,444 A | 11/1970 | Gam et al. | |
| 3,542,017 A | 11/1970 | Adams | |
| 3,568,667 A | 3/1971 | Krieger et al. | |
| 3,593,707 A | 7/1971 | Pifer | |
| 3,612,045 A | 10/1971 | Dudas et al. | |
| 3,669,101 A | 6/1972 | Kleiner | |
| 3,731,675 A | 5/1973 | Kelly | |
| 3,742,942 A | 7/1973 | Westline | |
| 3,753,435 A | 8/1973 | Blasnik | |
| 3,769,976 A | 11/1973 | Victory | |
| 3,769,977 A | 11/1973 | Victory | |
| 3,820,532 A | 6/1974 | Eberhardt | |
| 3,883,074 A | 5/1975 | Lambert | |
| 3,953,907 A | 5/1976 | Froidevaux | |
| 3,973,558 A | 8/1976 | Stouffer et al. | |
| 4,043,337 A | 8/1977 | Baugher | |
| 4,106,501 A | 8/1978 | Ozbey et al. | |
| 4,122,845 A | 10/1978 | Stouffer et al. | |
| 4,164,940 A | 8/1979 | Quinby | |
| 4,265,229 A | 5/1981 | Rice et al. | |
| 4,564,005 A | 1/1986 | Marchand et al. | |
| 4,630,629 A | 12/1986 | Nimberger | |
| 4,640,462 A | 2/1987 | Stearns, III | |
| 4,793,331 A | 12/1988 | Stewart | |
| 4,863,302 A | 9/1989 | Herzfeld | |
| 4,865,021 A | 9/1989 | Siderman | |
| 4,941,459 A | 7/1990 | Mathur | |
| 5,027,798 A | 7/1991 | Primiano | |
| 5,095,893 A | 3/1992 | Rawden, Jr. | |
| 5,104,315 A | 4/1992 | McKinley | |
| 5,136,128 A | 8/1992 | Thomas | |
| 5,218,956 A | 6/1993 | Handler et al. | |
| 5,220,914 A | 6/1993 | Thompson | |
| 5,292,074 A | 3/1994 | Clark et al. | |
| 5,360,026 A | 11/1994 | Klinkhammer | |
| 5,365,624 A | 11/1994 | Berns | |
| 5,387,182 A | 2/1995 | Otani | |
| 5,484,281 A | 1/1996 | Renow et al. | |
| 5,564,629 A | 10/1996 | Weissman | |
| 5,626,472 A | 5/1997 | Pennetta | |
| 5,667,483 A | 9/1997 | Santos | |
| 5,746,595 A | 5/1998 | Ford | |
| 6,089,865 A | 7/2000 | Edgar | |
| 6,193,512 B1 | 2/2001 | Wallace | |
| 6,203,320 B1 | 3/2001 | Williams | |
| 6,305,617 B1 | 10/2001 | Yu | |
| 6,766,549 B2 | 7/2004 | Klupt | |
| 6,795,981 B2 | 9/2004 | Sato et al. | |
| 6,893,259 B1 | 5/2005 | Reizenson | |
| 6,902,337 B1 | 6/2005 | Kuo | |
| 6,908,047 B2 | 6/2005 | Saunders et al. | |
| 7,059,853 B2 | 6/2006 | Hegemann | |
| 7,314,456 B2 | 1/2008 | Shaw | |
| D565,175 S | 3/2008 | Boyd et al. | |
| 7,367,803 B2 | 5/2008 | Egeresi | |
| D574,952 S | 8/2008 | Boyd et al. | |
| 7,814,585 B1 | 10/2010 | Reich | |
| 8,137,295 B2 | 3/2012 | Castaldi et al. | |
| 8,444,340 B2 | 5/2013 | Best | |
| 8,449,295 B2 | 5/2013 | Hegemann | |
| 8,647,447 B2 | 2/2014 | Bunting et al. | |
| 8,684,956 B2 | 4/2014 | McDonough et al. | |
| 8,801,316 B1 | 8/2014 | Abedini | |
| D725,770 S | 3/2015 | Kim et al. | |
| D728,118 S | 4/2015 | Welt et al. | |
| D747,464 S | 1/2016 | Taylor et al. | |
| D755,985 S | 5/2016 | Porat | |
| D802,119 S | 11/2017 | Kim | |
| 9,924,789 B2 | 3/2018 | Session | |
| 2002/0090591 A1* | 7/2002 | Fischer | A61C 5/40 433/90 |
| 2003/0181837 A1 | 9/2003 | Kaplowitz | |
| 2004/0045107 A1 | 3/2004 | Egeresi | |
| 2006/0057539 A1 | 3/2006 | Sodo | |
| 2006/0079818 A1 | 4/2006 | Yande | |
| 2007/0184404 A1 | 8/2007 | Johnki | |
| 2008/0078021 A1 | 7/2008 | Welch | |
| 2009/0082706 A1 | 3/2009 | Shaw | |
| 2009/0098506 A1 | 4/2009 | Shaw | |
| 2009/0124945 A1 | 5/2009 | Reich et al. | |
| 2009/0226241 A1 | 9/2009 | McEwen | |
| 2012/0064480 A1 | 3/2012 | Hegemann | |
| 2014/0261534 A1 | 9/2014 | Schepis | |
| 2015/0072303 A1 | 3/2015 | Boyd et al. | |
| 2015/0102130 A1 | 4/2015 | Davenport | |
| 2015/0250570 A1 | 9/2015 | Persons et al. | |
| 2016/0151133 A1 | 6/2016 | Luettgen et al. | |
| 2017/0318951 A1* | 11/2017 | Taghvai | A46B 13/02 |

FOREIGN PATENT DOCUMENTS

| | | |
|---|---|---|
| FR | 7424604 | 2/1976 |
| JP | 2006141613 A | 6/2006 |
| JP | 2006141913 A | 6/2006 |
| KR | 200374492 Y1 | 1/2005 |
| KR | 20120126260 A | 11/2012 |
| WO | 2004021958 A1 | 3/2004 |

OTHER PUBLICATIONS

Pneumadyne, Inc. Cross Section, 2-Way Normally Open, Nov. 28, 2016.
Pexco Medical, Multi-Lumen Tubing, www.pexco.com/medical, Nov. 28, 2016.
Pneumadyne, Bleed Values, last viewed Oct. 25, 2016.
Dental Depot, Showerfloss, https://www.dentaldepot.com/product/SHOWER_FLOSS/SHOWERFLO, last viewed Nov. 11, 2016.
Waterpik Showerpik Water Flosser (WP-480), www.amazon.com, last viewed Mar. 4, 2016.
Hydraulics & pneumatics, Sorting through pneumatic directional control valves, dated Apr. 1, 1997.
Standard Push Button Valve Drawing, Nov. 28, 2016.
Versa, Series B Valves, Air Valves for Industry Since 1949, Bulletin B-2011, www.versa-valves.com, Nov. 28, 2016.
The Waterpik ® White Ultra Water Flosser WP-100, https://www.waterpik.com/oral-health/products/dental-waterflosser/WP-100/, last viewed Nov. 11, 2016.
Mouthwash & Your Waterpik ® Water Flosser, dated Jun. 12, 2015, https://www.waterpik.com/oralhealth/blog/waterpik-mouthwash/, last viewed Nov. 4, 2016.

(56) References Cited

OTHER PUBLICATIONS

Wikipedia.com, Gingivitis, https://en.wikipedia.org/wiki/Gingivitis, last viewed Mar. 4, 2016.
Wikipedia.com, Oral irrigator, https://en.wikipedia.org/wiki/Oral_irrigator, last viewed Mar. 4, 2016.
English Translation FR2277567 Jean Baptiste published Feb. 6, 1976.
KleenTeeth DenTrust 3-Sided Toothbrush—Soft http://www.kleenteeth.com/dentrust-3-sided-toothbrushsoft/?gclid=CLr8, last viewed Dec. 19, 2016.
International Report on Patentabililty for PCT/US2017/067792 dated Jul. 9, 2019, 9 pages.

* cited by examiner

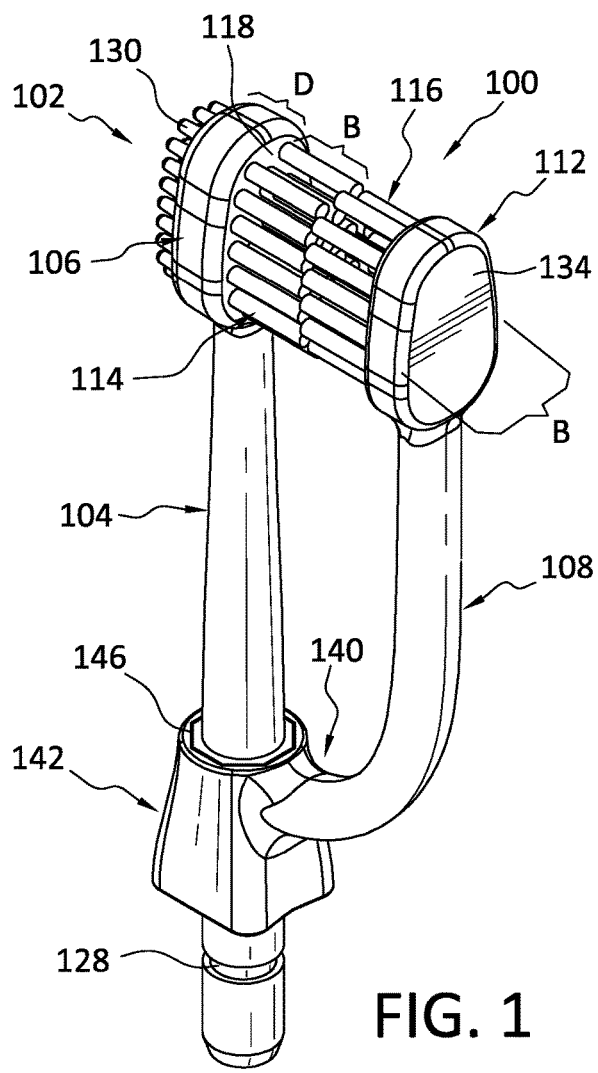
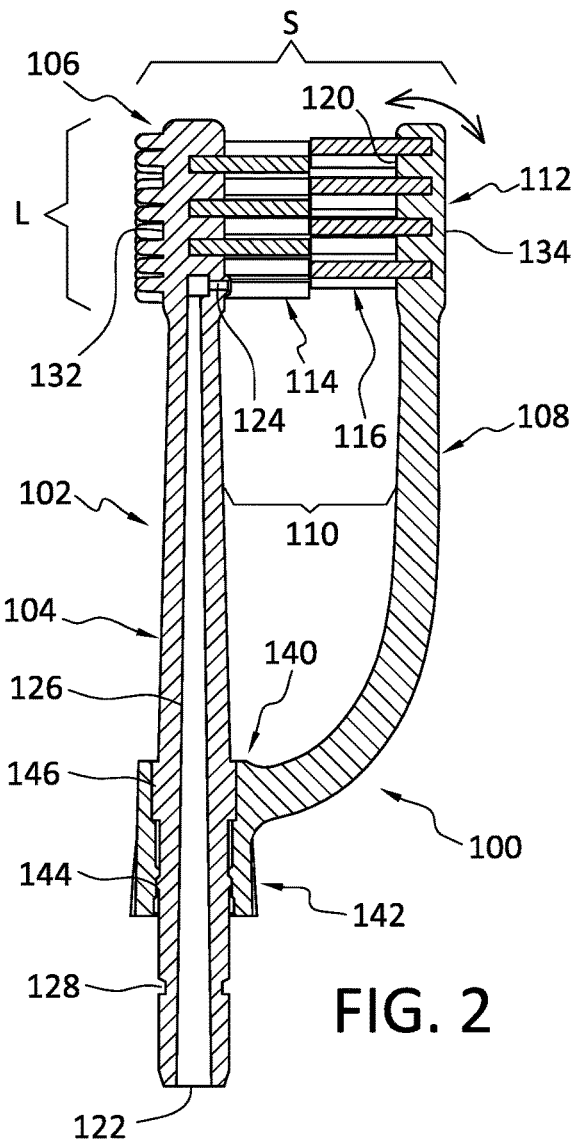
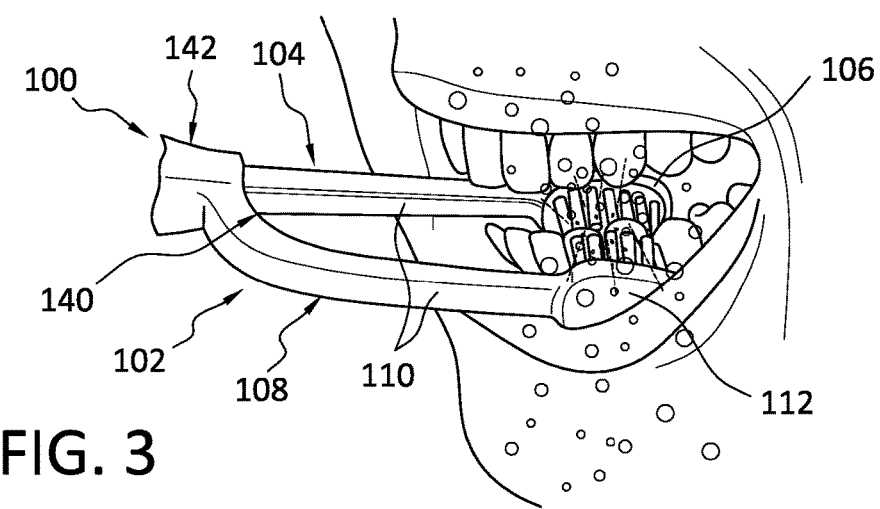
FIG. 1
FIG. 2
FIG. 3

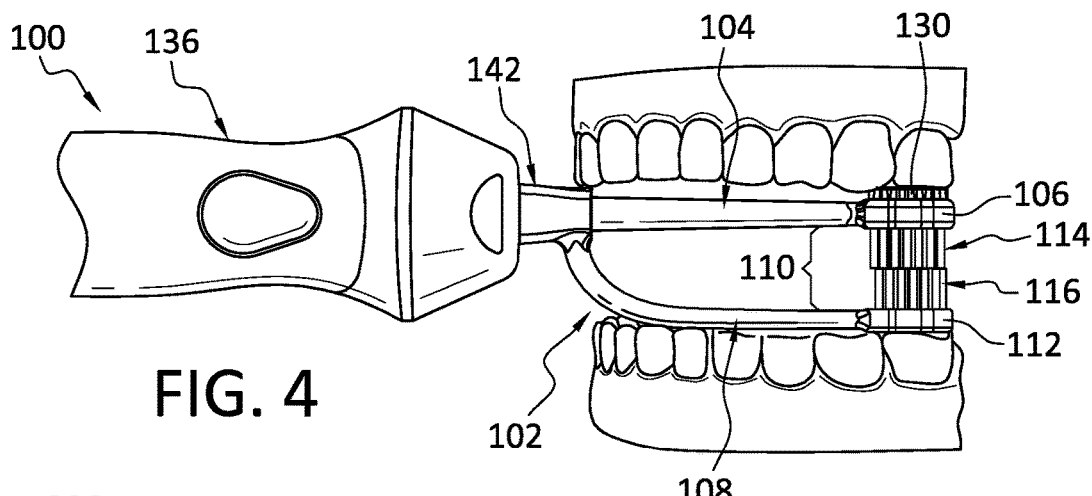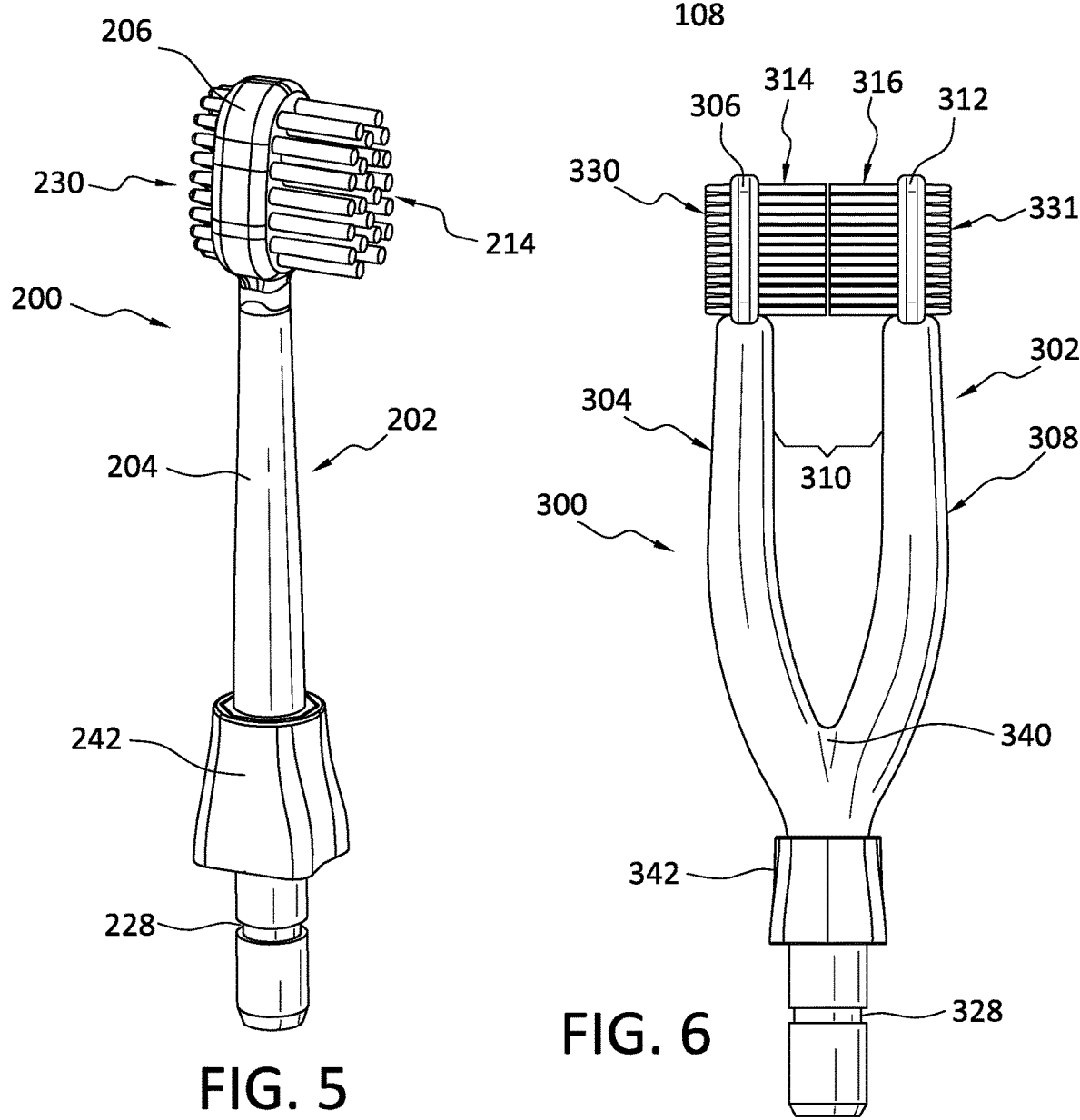

ORAL CLEANING SYSTEM

TECHNICAL FIELD

The disclosure relates generally to oral cleaning devices.

BACKGROUND

Over the years, many oral cleaning devices have been developed including electric toothbrushes, oral irrigators, and flossers and many products have enjoyed widespread commercial success. Nonetheless, these devices have many deficiencies, and for many users and in many situations, they are inadequate or unsuitable.

Electric or power toothbrushes, for instance, are often complicated, expensive, and require an electric power source and more time in maintenance than a manual toothbrush. Moreover, brushing too vigorously with electric toothbrushes can irritate the gums or cause them to bleed excessively, possibly injuring the gums or causing them to recede. Also, brushing with even the best power toothbrushes is not enough to prevent gum disease and tooth decay, and most users only do a fair job of brushing.

Oral irrigators while of benefit to many users can also be less than ideal. For example, oral irrigators can be ineffective if the water jet is not correctly directed to the area where it may be most needed for oral irrigation and stimulation. Additionally, oral irrigators are typically countertop units that occupy precious countertop space and tend to make a mess on the mirror and/or in the sink. They also typically use a loud noisy motor and require a user to uncomfortably bend over the sink during use. They also include a water reservoir that needs to be refilled and cleaned, inconveniencing users. Moreover, most oral irrigators require an external power source such as an electrical outlet near the sink or batteries that need to be charged and/or replaced. This can be expensive and/or a problem for a user that does not have the requisite electrical outlet available.

There is thus a need for an oral cleaning system that provides effective cleaning of the teeth, gums, and mouth and is easier and more convenient to use.

SUMMARY

Embodiments of the present disclosure advantageously combine oral irrigation and toothbrushing to enhance the effectiveness of oral care, ease of use, and convenience for a user.

According to an embodiment, an oral cleaning system includes a toothbrush body with a first stem. The first stem has a rigid configuration and a first head with a first plurality of bristles. A channel is defined within the first stem and at least one fluid outlet is defined in the first head. The at least one fluid outlet is in fluid communication with the channel and is configured to facilitate irrigation of a mouth, gums, or teeth via the first head. A second stem is connected to the first stem and extends upwardly and outwardly from a distal portion of the first stem. The second stem includes a second plurality of bristles and is generally opposed and spaced from the first head. The second stem has a semi-flexible configuration such that the second head is resiliently movable inwardly or outwardly relative to the first head without substantially bending the first stem.

The rigidity or inflexibility of the first stem can advantageously prevent deformation, reconfiguration, necking, and/ or kinking of the channel within the first stem. This helps reduce the likelihood of unwanted backflow or restricted flow within the channel, which, in turn, helps provide a more forceful flow of fluid through the channel for irrigation. Moreover, because the first stem and the channel can be fixed or substantially fixed relative to a pressurized fluid source supplying the fluid, little or no flow energy is lost through movement of the first stem.

When the heads are positioned to straddle the teeth, the second head can flex outwardly around the teeth and the material properties of the second stem can bias the second head back toward the teeth without substantially bending the first stem. This allows at least the first bristles to exert a compressive force on the teeth located between the heads as the user brushes, helping to remove plaque and other materials from the teeth. Simultaneously, a user can activate the system to clean between the teeth and/or the gums using at least one fluid jet exiting the at least one fluid outlet.

According to a variation, a plurality of nubs can protrude outwardly from a back face of the first head. A user can position the toothbrush body in the mouth such that the nubs are positioned on at least some of the chewing surfaces of the teeth. The user then moves the toothbrush body cleaning the chewing surfaces with the nubs. The user may also move or run the nubs over the tongue to clean the tongue.

According to an embodiment, a user may also provide a force on the second head and urge it inwardly towards the first head without significantly bending the first stem. Moving the second head closer to the first head beneficially reduces an offset between the stems. This decreases the degree to which a user must open the mouth in order to use the nubs to clean the chewing surfaces of the teeth.

BRIEF DESCRIPTION OF THE DRAWINGS

These and other features, aspects, and advantages of the present disclosure will become better understood regarding the following description, appended claims, and accompanying drawings.

FIG. 1 is a side perspective view of an oral cleaning system including a toothbrush body according to an embodiment.

FIG. 2 is a cross section of the toothbrush body in FIG. 1.

FIG. 3 is a side perspective view of the oral cleaning system in FIG. 1 in use according to an embodiment.

FIG. 4 is a side perspective view of the oral cleaning system in FIG. 1 in use according to another embodiment.

FIG. 5 is a side perspective view of an oral cleaning system including a toothbrush body according to another embodiment.

FIG. 6 is a side perspective view of an oral cleaning system including a toothbrush body according to another embodiment.

Figures 7, 8:
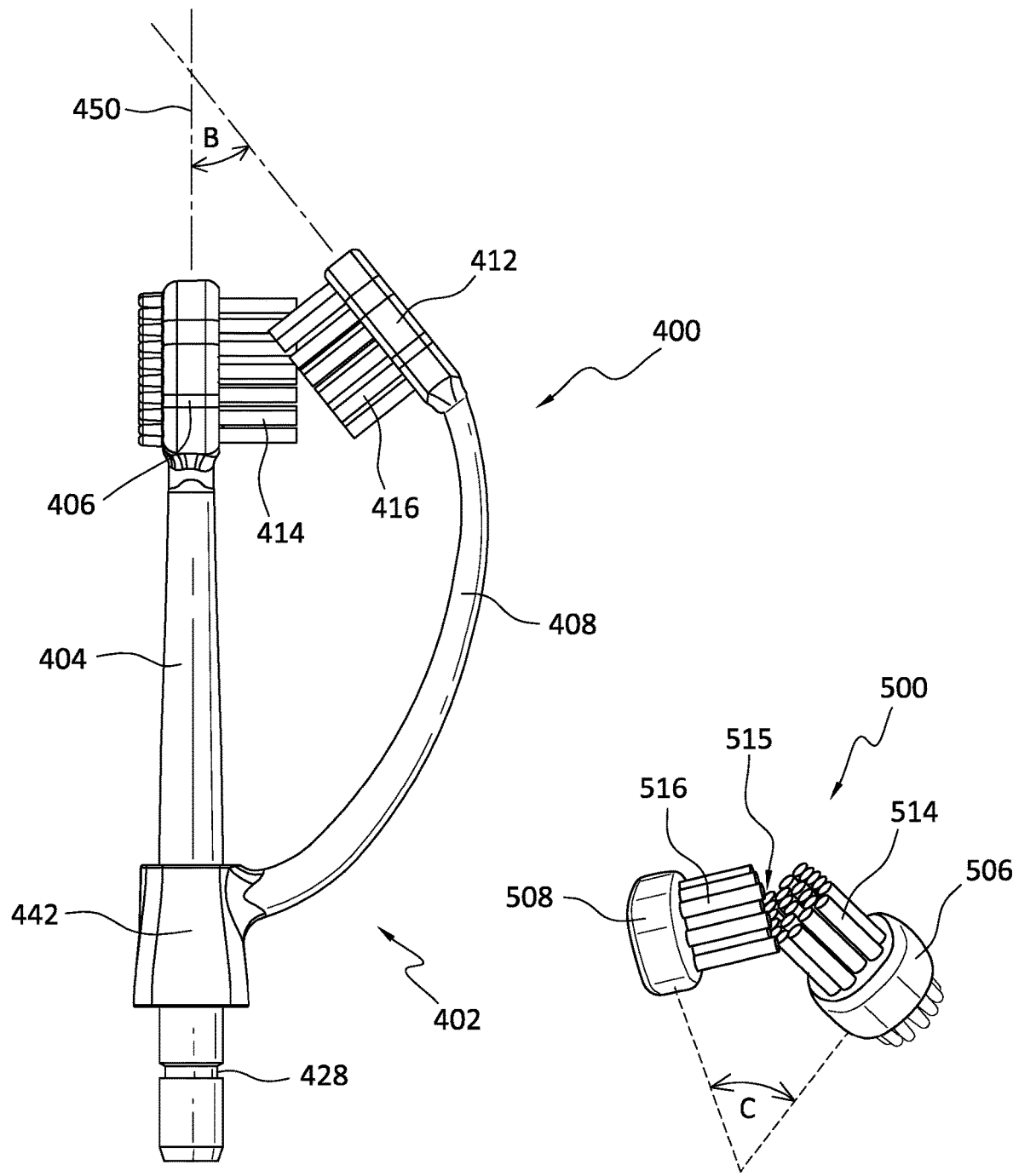
FIG. 7 is a side perspective view of an oral cleaning system including a toothbrush body according to another embodiment.
FIG. 8 is a top perspective view of an oral cleaning system including a toothbrush body according to another embodiment.

The drawing figures are not necessarily drawn to scale, but instead are drawn to provide a better understanding of the components, and are not intended to be limiting in scope, but to provide exemplary illustrations. The figures illustrate exemplary configurations of prosthetic socket systems, and in no way limit the structures or configurations of a prosthetic socket system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning. It will be appreciated that the term "user" as used herein may refer to an individual using the system of the present disclosure in his or her mouth, or to an individual (e.g., a dental hygienist, a veterinarian, or a parent) using the system on another individual or animal.

The terms "rigid," "flexible," and "resilient" may be used herein to distinguish characteristics of portions of certain features of the toothbrush body. The term "rigid" is intended to denote that an element of the toothbrush body is generally devoid of flexibility. Within the context of stems that are "rigid," it is intended to indicate that they do not lose their overall shape when force is applied, and in fact they may break if bent with sufficient force. On the other hand, the term "flexible" is intended to denote that features are capable of repeated bending such that the stems or heads may be bent into retained shapes or the features do not retain a general shape, but continuously deform when force is applied. The term "resilient" is used to qualify such flexible elements as generally returning to an initial general shape without permanent deformation. As for the term "semi-flexible," this term is used to connote properties of stems or heads that provide support and are free-standing; however, such stems or heads may have some degree of flexibility or resiliency.

Embodiments of the present disclosure advantageously combine oral irrigation and toothbrushing to enhance the effectiveness of oral care, ease of use, and convenience for a user. FIGS. 1-4 illustrate an oral cleaning system 100 according to an embodiment including a toothbrush body 102 having a first stem 104 with a first head 106. A second stem 108 is connected to the first stem 104 at a connection 140 and extends outwardly and upwardly from a distal portion of the first stem 104 to define an offset 110 between the first stem 104 and the second stem 108. The second stem 108 can be attached to the first stem 104 or can be integrally formed with the first stem 104. The first stem 104 can comprise a main stem and the second stem 108 can comprise a secondary stem.

In an embodiment, the first stem 104 is straight or substantially straight along a longitudinal axis of the first stem 104 and the second stem 108 curves outwardly and upwardly along its longitudinal axis from the distal portion of the first stem 104 such that the first stem 104 and the second stem 108 are spaced apart and substantially parallel to one another toward the first head 106 when the toothbrush body 102 is in a neutral position (shown in FIG. 2). In other embodiments, the second stem 108 can angle relative to the first stem 104 to offset the first and second heads 106, 112. In other embodiments, the second stem 108 can angle and curve relative to the first stem 104.

As seen, the second stem 108 includes a second head 112 generally opposed and spaced from the first head 106. The first head 106 and the second head 112 can be integral or removably attached to their respective stems, and include first and second pluralities of bristles 114, 116 extending from respective faces 118, 120 that are facing each other.

In use, a user places the toothbrush body 102 inside the mouth such that the first bristles 114 on the first head 106 and the second bristles 116 on the second head 112 straddle each side of the teeth as shown in FIG. 3. The user then moves the toothbrush body 102 to brush and/or clean the teeth with the first and second bristles 114, 116. The first stem 104 and the second stem 108 may be made of any suitable material that is safe for contact with a person's mouth, teeth, and/or mouth rinse. For instance, the first stem 104 and the second stem 108 can include an Acrylonitrile-Butadiene-Styrene copolymer (ABS) and/or any other suitable material.

Referring now to FIG. 2, the toothbrush body 102 is further configured for irrigating between the teeth and/or the gums. For instance, a fluid inlet 122 is formed in a bottom of the first stem 104, and at least one fluid outlet 124 is defined in the face 118 of the first head 106. The fluid inlet 122 is fluidly connected to the at least one fluid outlet 124 via a channel 126 formed in the first stem 104. A fitting 128, such as a quick disconnect fitting, can be located at or near the bottom of the first stem 104. The at least one fluid outlet 124 is shown as a single fluid outlet however in other embodiments the at least one fluid outlet 124 can include two, three, or any other number of fluid outlets.

In operation, a pressurized fluid source providing a supply of fluid (e.g., water and/or a mixture of water and mouth rinse), is coupled or connected to the toothbrush body 102 via the fitting 128. The pressurized fluid source can comprise an oral irrigator, such as the oral irrigator described in U.S. Ser. No. 15/401,144, now U.S. Pat. No. 10,478,267, and owned by the assignee of this disclosure, the disclosure of which is incorporated herein in its entirety by this reference. In other embodiments, the pressurized fluid source can comprise a countertop flosser or pressurized line or tube connected to a fluid source.

From the pressurized fluid source, pressurized fluid enters or is received by the fluid inlet 122 in the first stem 104, moves through the channel 126, and exits the first head 106 from the at least one fluid outlet 124. The at least one fluid outlet 124 is positioned and configured so that the exiting fluid forms at least one fluid jet that can be directed to the teeth or gums. This fluid or at least one fluid jet is configured to clean or rinse the mouth of the user, including between the teeth and/or the gums. The user can thus move the toothbrush body 102 to brush using the first and second bristles 114, 116 and simultaneously clean and rinse using the at least one fluid jet exiting the first head 106. In addition, the fluid jet can flush plaque and other materials as they are loosened from the teeth by the first and second bristles 114, 116. The at least one fluid outlet 124 is preferably located below the first bristles 114 to reduce the likelihood of interference with the first bristles 114 from the at least one fluid jet. In other embodiments, the fluid can be directed to move through the first bristles 114 or to exit the at least one fluid outlet 124 above the first bristles 114. In other embodiments, the fluid can be directed to pass through, below the first bristles 114, above the first bristles 114, and/or a combination thereof.

The first stem 104 preferably is more rigid than the second stem 108. For example, the first stem 104 can have a stiff or inflexible configuration and the second stem 108 can have a semi-flexible or resilient configuration so that the second stem 108 can bend or flex relative to the first stem 104. For example, the second stem 108 can be resiliently movable inwardly or outwardly relative to the first stem 104 without substantially bending the first stem 104 as discussed herein. This beneficially can improve both the brushing and irrigating performance of the oral cleaning system 100.

In an embodiment, the rigidity or inflexibility of the first stem 104 can prevent deformation, reconfiguration, necking, and/or kinking of the channel 126 within the first stem 104. This helps reduce the likelihood of unwanted backflow or restricted flow within the channel 126, which, in turn, helps provide a more regular or forceful flow of fluid through the channel 126, improving the irrigation of the system 100. Moreover, because the first stem 104 and the channel 126 are fixed or substantially fixed relative to the pressurized fluid source during use, little or no flow energy is lost through movement of the first stem 104. In an embodiment, the channel 126 can carry a tube or a hose fluidly connecting the fluid inlet 122 and the at least one fluid outlet 124. In other embodiments, the tube or hose can be omitted. In yet other embodiments, the channel can be omitted. For instance, fluid can be conveyed to the at least one fluid outlet via a tube or hosing located outside of the first stem 104 and connected to the pressurized fluid source.

Optionally, the first head 106 can include a plurality of nubs 130 protruding outwardly from a back face 132 on the first head 106. At least some of the nubs 130 can have a length between about 2 millimeters (mm) and about 3 mm (e.g., about 2.5. mm), which is generally enough length for the nubs 130 to satisfactorily clean the cusps and/or fossa of the chewing surfaces of the teeth. As seen in FIG. 4, the toothbrush body 102 can be attached to a pressurized fluid source 136 and a user can position the toothbrush body 102 in the mouth such that the nubs 130 are positioned on at least some of the chewing surfaces of the teeth. The user then moves the toothbrush body 102 to clean the chewing surfaces with the nubs 130. The user may also move or run the nubs 130 over the tongue to clean the tongue. In other embodiments, the nubs 130 may be provided additionally or alternatively on a back face 134 of the second head 112. The nubs 130 can comprise an elastomeric material overmolded on the back face 132. For instance, the nubs 130 can be formed of an elastomeric material such as silicone rubber or a thermoplastic elastomer (TPE).

According to a variation, the first head 106 can be configured such that a user can simultaneously rinse the chewing surfaces by selectively activating at least one fluid jet exiting from at least one fluid outlet formed in the back face 132 of the first head 106.

The first stem 104 and the second stem 108 can further enhance the brushing action of the system 100. For example, the second stem 108 is configured to resiliently flex or bend such that the second head 112 can be displaced inwardly and/or outwardly relative to the first head 106 without substantially bending the first stem 104. In an embodiment, the second stem 108 can resiliently flex or bend about a point or region toward the connection 140 to move the second head 112 relative to the first head 106. In other embodiments, the second stem 108 can resiliently flex or bend at a point or region along another length of the second stem 108. In an embodiment, the second stem 108 can define a greater cross section area toward the connection 140 such that the second head 112 can flex inwardly toward the first head 106 without undue or undesirable flexing parallel to the face 118 of the first head 106.

According to an embodiment, the second head 112 can flex between about 2 mm and about 5 mm (e.g., about 3 mm) toward and/or away from the first head 106 or the neutral position. In other embodiments, the second head 112 can flex between about 2 mm and about 4 mm inwardly and/or outwardly toward the first head 106. When the second head 112 is flexed or positioned to straddle the teeth as shown in FIG. 3, the second head 112 flexes outwardly around the teeth and the material properties of the second stem 108 can bias the second head 112 back toward the teeth without significantly bending the first stem 104. This allows at least the second bristles 116 to exert a compressive or cleaning force on the teeth located between the first head 106 and the second head 112 as the user brushes, helping to remove plaque and other materials from the teeth. Simultaneously, the user can activate the system 100 to clean between the teeth and/or the gums using the at least one fluid jet exiting the first head 106 as shown.

A user may also provide a force on the second head 112 and urge it inwardly towards the first head 106 without significantly bending the first stem 104. Moving the second head 112 closer to the first head 106 beneficially reduces the offset 110 between the first and second stems 104, 108. This decreases the degree to which a user must open the mouth in order to use the nubs 130 to clean the chewing surfaces of the teeth (shown in FIG. 4). It will be appreciated that in other embodiments the second head 112 can move more or less in relation to the first head 106.

In the illustrated embodiment, the first and second heads 106, 112 extend generally parallel to one another when the toothbrush body 102 is in the neutral position (shown in FIG. 2). Alternatively, the first and second heads 106, 112 can be angled relative to one another. For example, the second head 112 can angle inwardly between about 35 degrees and about 55 degrees (e.g., about 45 degrees) relative to the first head 106. This advantageously can allow the second head 112 to apply a greater cleaning force on the teeth when it engages the teeth and flexes outwardly toward a parallel position relative to the first head 106. In other embodiments, the first and second heads 106, 112 can be angled relative to one another about a longitudinal axis of the toothbrush body 102. This beneficially can allow the first and second bristles 114, 116 to apply a greater or more concentrated cleaning force where the first and second bristles 114, 116 converge. It also can reduce the degree to which a user must open the mouth to use the nubs 130 as discussed above.

According to a variation, when the toothbrush body 102 is activated and positioned in the mouth, fluid exiting from the at least one fluid outlet 124 can force the second head 112 outwardly relative to the first head 106 before the first and second heads 106, 112 are positioned to straddle the teeth, increasing a gap between the first and second bristles 114, 116. This can beneficially help locate the toothbrush body 102 on the teeth for brushing.

According to another variation, when the toothbrush body 102 is activated, fluid moving through the channel 126 can increase or enhance the rigidity of the first stem 104. This can help the first and second bristles 114, 116 to exert a greater compressive or cleaning force on the teeth, helping to remove plaque and other materials from the teeth.

According to yet another variation, the brushing firmness of the toothbrush body 102 can be adjusted by varying the degree of flexibility of the second stem 108 relative to the first stem 104. For instance, less flexibility in the second stem 108 can provide a firmer brushing action and more flexibility in the second stem 108 can provide a softer brushing action. This is advantageous over prior art toothbrushes that can only adjust the firmness of the toothbrush by changing the bristles.

While the toothbrush body 102 is generally described and shown for human usage, it will be appreciated that in other embodiments the toothbrush body 102 can be sized and configured for use by dogs, horses, cats, livestock, and the like. For instance, the second stem 108 can be removably attached to the first stem 104 and interchangeable with different second stems configured for use by different animals such as a horse. Moreover, the first stem 104 and second stem 108 can have a modular or interchangeable configuration. For instance, the first stem 104 and/or the second stem 108 can be manufactured in different sizes to better accommodate a variety of users such as children, adults, and elderly users. In an embodiment, the first stem 104 can be manufactured in a single configuration and the second stem 108 can be manufactured in a variety of configurations compatible with the first stem 104 to accommodate different users and/or applications (e.g., children, dogs, or horses).

Referring again to FIGS. 1 and 2, the structure of the toothbrush body 102 will be described in additional detail. A width S of the toothbrush body 102 can be defined between the tips of the nubs 130 and the back face 134 of the second head 112. The width S can be configured so that a user can more comfortably or conveniently insert the first and second heads 106, 112 in the mouth with the first and second bristles 114, 116 on each side of the teeth. For instance, the width S can be between about 25 mm and about 35 mm (e.g., about 29 mm), reducing the overall width of the toothbrush body 102. It will be appreciated that the dimensions of the toothbrush body 102 provided above are exemplary only and can be larger or smaller in other embodiments based on the characteristics of the user or other factors.

A thickness D of the first head 106 can be defined between the faces. The thickness D can be configured to allow for the bristles to be secured attached to the first head 106. For instance, the thickness D of the first head 106 can be between about 4 mm and about 8 mm (e.g., about 6 mm). The thickness of the second head 112 can be the same or different that the thickness D. For instance, the thickness of the second head 112 can be about 4.5 mm and less than the thickness D when the second head 112 omits an overmold.

A length L of the first head 106 and/or the second head 112 is configured to allow the first and second heads 106, 112 to more easily navigate the inside curvature of the teeth when the toothbrush body 102 is placed over the teeth such that the first and second bristles 114, 116 directly face the sides of the teeth. For instance, the lengths L of the first head 106 and the second head 112 can be between about 16 mm and about 18 mm (e.g., about 17.3 mm). The length L can be advantageously shorter than a length of a conventional head of a manual toothbrush, improving the usability of the toothbrush body 102 as a dual headed toothbrush. A width W of the first head 106 and the second head 112 can be between about 10 mm and about 14 mm (e.g., about 12 mm). It will be appreciated that the dimensions of the first and second heads 106, 112 provided are exemplary only and can be larger or smaller in other embodiments.

A length B of the first bristles 114 extending from the first head 106 can be selected for cleaning the teeth. For instance, the length B can be between about 4 mm and about 12 mm (e.g., about 8 mm). The length of the second bristles 116 extending from the second head 112 can be the same or different as the length B. Optionally, a gap 138 is formed between the ends of the first bristles 114 and the second bristles 116. The gap 138 can help prevent the first and second bristles 114, 116 from interfering with each other and facilitate positioning of the toothbrush body 102 on the teeth. The gap 138 can be between about 0.1 mm and about 1 mm. For instance, the gap 138 can be about 0.14 mm.

At least some of the first and second bristles 114, 116 can have a diameter between about 1 mm and 2 mm (e.g., about 1.5 mm). In an embodiment, at least some of the first and second bristles 114, 116 can extend a specified depth into the heads 106, 112. For instance, at least some of the first bristles 114 can extend between about 3 mm and about 3.5 mm (e.g., about 3.3 mm) into the first head 106. In an embodiment, a lateral spacing may be defined between the bristles. For instance, a lateral spacing of between about 2.5 mm and about 3 mm (e.g., about 2.68 mm) can be defined between the first bristles 114 and/or the second bristles 116.

According to a variation, the first bristles 114 of the first head 106 and the second bristles 116 of the second head 112 can be laterally offset such that the first and second bristles 114, 116 interdigitate or mesh with one another. This arrangement of the first and second bristles 114, 116 facilitates movement of the second head 112 inwardly toward the first head 106 when it is desired to use the toothbrush body 102 to clean the cusps and fossa of the chewing surfaces of the teeth using the nubs 130. For instance, because the first and second bristles 114, 116 can interdigitate or mesh, the second head 112 can flex between about 2.4 mm and about 4 mm (e.g., 3 mm) toward the first head 106. In other embodiments, the first bristles 114 of the first head 106 and the second bristles 116 of the second head 112 can be generally aligned. This can allow for a closer lateral spacing between the bristles on a given head. It will be appreciated that the dimensions and spacing of the first and second bristles 114, 116 provided are exemplary only and can be larger or smaller in other embodiments.

The first stem 104 is shown having a round cross-section but can have any suitable cross-section shape. An outer diameter of the first stem 104 can be constant or can vary. For instance, the outer diameter of the first stem 104 can taper from about 6.6 mm toward the bottom of the first stem 104 to about 4.6 mm at or near the first head 106. It will be appreciated that the dimensions of the first stem 104 provided are exemplary only and can be larger or smaller in other embodiments.

As best shown in FIG. 2, the channel 126 can have a varying diameter. For instance, the diameter of the channel 126 can taper from the fluid inlet 122 toward the at least one fluid outlet 124. The decreasing diameter of the channel 126 toward the at least one fluid outlet 124 can help provide a more forceful flow of pressurized fluid (e.g., water or a water and mouthwash mixture) to assist in cleaning the teeth. In an embodiment, the diameter of the channel 126 can taper from about 3.5 mm to about 1 mm. A diameter of the fluid inlet 122 can be between about 3 mm and about 3.5 mm (e.g., about 3.38 mm). A diameter of the at least one fluid outlet 124 can be between about 0.5 mm and about 1.5 mm (e.g., about 1 mm). The at least one fluid outlet 124 can be located below the first bristles 114 to reduce the likelihood of interference with the first bristles 114 during use. It will be appreciated that the diameters of the channel 126, the fluid inlet 122, and/or the at least one fluid outlet 124 provided are exemplary only and can be larger or smaller in other embodiments.

The second stem 108 preferably has a solid configuration and can have a length between 40 mm and about 80 mm (e.g., about 60 mm). Like the first stem 104, the second stem 108 can have any suitable cross section shape. For instance, the second stem 108 can have an oval cross section shape. The oval cross section shape can define a major diameter of about 7 mm (e.g., about 6.84 mm) and a minor diameter of about 5 mm (e.g., about 4.85 mm). In other embodiments, the second stem 108 can have a generally square or rectangular cross section, with corners that are rounded, sharp, or combinations thereof. For instance, the second stem 108 can have top corners with a sharp configuration, and bottom corners with a rounded configuration. As discussed above, the second stem 108 can have a greater diameter toward the connection 140 between the second stem 108 and the first stem 104. It will be appreciated that the dimensions of the second stem 108 provided are exemplary only and can be larger or smaller in other embodiments. In other embodiments, the second stem 108 can have a hollow configuration.

The connection 140 between the first stem 104 and the second stem 108 can comprise a collar member 142 joining the second stem 108 to the first stem 104. The collar member 142 can be integrally formed on the second stem 108 such that the second stem 108 is rigidly fixed to the first stem 104. The collar member 142 can be fixedly joined to the first stem 104 by a snap joint 144 and/or a torsional lock 146. The snap joint 144 is configured to prevent or limit undesirable vertical movement of the second stem 108 on the first stem 104. The torsional lock 146 is configured to prevent or limit the second stem 108 from rotating around the first stem 104. In an embodiment, the torsional lock 146 can comprise nesting octagons or other polygons. The outer peripheral shape of the collar member 142 is configured for aesthetic appeal and to sit comfortably in one's hand.

It will be appreciated that in other embodiments the second stem 108 can be joined to the first stem via the gluing or ultrasonic welding at or near the connection 140. In yet other embodiments, the first stem 104 and the second stem 108 can be formed of a unitary member, such as by injection molding.

As discussed above, the second stem 108 may be removably attached to the first stem 104. For example, FIG. 5 illustrates another embodiment of an oral cleaning system 200 including a toothbrush body 202 in which the second stem has been removed or omitted and replaced with a collar member 242 on a first stem 204. The first stem 204 can include the same or similar features as the first stem 104. For instance, the first stem 204 includes a first head 206 having a first plurality of bristles 214 and nubs 230 and is configured for connection to a pressurized fluid source via a fitting 228 such that a pressurized fluid enters the first stem 204 via a fluid inlet, moves through a channel formed in the first stem 204, and exits the first head 206 from at least one fluid outlet. Like in the previous embodiment, this fluid or at least one fluid jet is configured to clean or rinse the mouth of the user. The user can thus both brush and irrigate the teeth and mouth using the oral cleaning system 200. It will be appreciated by omitting the second stem, the manufacturing costs and/or purchase price of the oral cleaning system 200 can be reduced.

In an embodiment, the collar member 242 is removably attached to the first stem 204. This beneficially can allow a user to replace the collar member 242 with a second stem of the present disclosure, which, in turn, allows the user to use the oral cleaning system 200 with one or two heads as desired, providing greater versatility than toothbrushes of the prior art. The collar member 242 can be configured to provide a handle for a user. For instance, the collar member 242 can be configured to be comfortably held in a hand during use.

FIG. 6 illustrates yet another embodiment of an oral cleaning system 300 including a toothbrush body 302 according to the present disclosure. As seen, the toothbrush body 302 includes a first stem 304 having a first head 306, and a second stem 308 having a second head 312. The first stem 304 and second stem 308 are shown being generally symmetric above a connection 340 connecting the second stem 308 to the first stem 304. For instance, the second stem 308 can be connected to a distal portion of the first stem 304 at the connection 340, with each curving upwardly and outwardly from the connection 340 to define an offset 310 therebetween. The second head 312 is generally opposed and separated from the first head 306. The first and second heads 306, 312 each include a plurality of bristles 314, 316 facing each other, and nubs 330, 331 extending from the back faces of the first and second heads 306, 312. In use, a user positions the toothbrush body 302 inside the mouth such that the first bristles 314 and the second bristles 316 straddle each side of the teeth. The user then moves the toothbrush body 302 to brush and/or clean the teeth. The user can alternatively position the toothbrush body 302 in the mouth such that nubs 330 and/or the nubs 331 are positioned on at least some of the chewing surfaces of the teeth or tongue. The user then moves the toothbrush body 302 to clean the chewing surfaces or tongue with the nubs.

Like described previously, the toothbrush body 320 can be configured to irrigate between the teeth and/or the gums. For instance, a fluid inlet can be formed in a bottom of the first stem 304, and at least one fluid outlet can be defined in a face of the first head 306. The fluid inlet can be fluidly connected to the at least one fluid outlet via a channel formed in the first stem. A fitting 328 can be located at or near the bottom of the first stem 304 to couple or attach the toothbrush body 302 to a pressurized fluid source as described above. A collar member 342 is located on the toothbrush body 302 above the fitting 328. The collar member 342 can be configured to provide a handle for using the toothbrush body 302. The collar member 342 may also be configured to help for the coupling between the toothbrush body 302 and the pressurized fluid source. For instance, a bottom of the collar member 342 can define a stop arranged to engage with the pressurized fluid source and align the fitting 328 with a corresponding element on the pressurized fluid source.

In other embodiments, the fluid inlet can be fluidly connected to at least one fluid outlet defined in a face of the second head 312 via a channel formed in the second stem 308. In yet other embodiments, the fluid inlet is fluidly connected to both the first head 306 and the second head 312 via channels formed in the respective stems such that the toothbrush body 302 can irrigate on both sides of the teeth.

The first stem 304 and the second stem 308 are also configured to enhance the brushing action of the oral cleaning system 300. For instance, one or more of the first and second heads 306, 312 can be configured to bend or flex relative to the other head. As such, when the first and second heads 306, 312 are positioned to straddle the teeth, one or both heads can flex outwardly around the teeth. This allows the bristles 314, 316 to exert a compressive force on the teeth as the user brushes, helping to remove plaque and other materials from the teeth. In an embodiment, the first stem 304 can define the fluid channel and can be rigid or inflexible, and the second stem 308 can be configured to flex or bend relative to the first stem 304 without substantially bending the first stem 304. This beneficially allows the second head to exert a compressive force on the teeth without negatively impacting the pressurized flow of fluid through the first stem 304.

A user may also urge one of the first and second heads 306, 312 toward the other, decreasing the degree to which the user must open the mouth in order to use the nubs 330, 331 to clean the chewing surfaces of the teeth. For instance, the user may urge the second head 312 toward the first head 306 as needed to comfortably position the toothbrush body 302 in the mouth.

Accordingly, the oral cleaning system 300 can comfortably and effectively clean teeth and/or the mouth using both brushing and irrigation.

FIG. 7 illustrates yet another embodiment of an oral cleaning system 400 including a toothbrush body 402 according to the present disclosure. The toothbrush body 402 includes a first stem 404 having a first head 406, and a second stem 408 having a second head 412. The first and second heads 406, 412 each include a plurality of bristles 414, 416 facing each other, and the first head 406 includes a plurality of nubs extending from a back face of the first head 406. A fitting 428 can be located at or near a bottom of the first stem 404 to couple or attach the toothbrush body 402 to a pressurized fluid source as described above. A collar member 442 can be located on the toothbrush body 402 above the fitting 428 for attaching the second stem 408 to the first stem 404. The collar member 442 can removably attach the second stem 408 to the first stem 404.

In the illustrated embodiment, the first and second heads 406, 412 are angled relative to one another. For instance, the second head 412 can angle inwardly at an angle B between about 30 degrees and about 50 degrees, or between about 40 degrees, and about 45 degrees (e.g., 45 degrees) relative to the first head 406. This angled relationship between the first and second heads 406, 412 advantageously can allow the second head 412 to apply a greater cleaning force on the teeth when the second head 412 engages the teeth and flexes outwardly toward a parallel position relative to the first head 406, increasing the angle B.

In use, a user positions the toothbrush body 402 inside the mouth so that the first bristles 414 and the second bristles 416 straddle each side of the teeth. This causes the second head 412 to flex outwardly against the teeth, increasing the angle B. The user then moves the toothbrush body 402 to brush and/or clean the teeth. The user can alternatively position the toothbrush body 402 in the mouth so that the nubs are positioned on at least some of the chewing surfaces of the teeth or tongue. The user then moves the toothbrush body 402 to clean the chewing surfaces or tongue with the nubs.

Like in other embodiments, the toothbrush body 402 can be configured to irrigate between the teeth and/or the gums. For instance, the second stem 408 can have a semi-flexible configuration such that the second head 412 is resiliently movable inwardly or outwardly relative to the first head 406 without substantially bending the first stem 404 having a more rigid configuration.

The rigidity or inflexibility of the first stem 404 can advantageously prevent deformation, reconfiguration, necking, and/or kinking of a channel defined within the first stem 404 for receiving a supply of fluid from the pressurized fluid source, which is forcefully emitted from a fluid outlet defined in the first head 406. This helps reduce the likelihood of unwanted backflow or restricted flow within the channel, which, in turn, helps provide a more forceful flow of fluid through the channel for irrigation. Moreover, because the first stem 404 and the channel can be fixed or substantially fixed relative to a pressurized fluid source supplying the fluid, little or no flow energy is lost through movement of the first stem 404.

FIG. 8 illustrates yet another embodiment of an oral cleaning system 500 including a toothbrush body 502 according to the present disclosure with a first stem having a first head 506, and a second stem having a second head 512. The first and second heads 506, 512 each include a plurality of bristles 514, 516 generally facing each other. As seen, at least one of the first and second heads 506, 512 are rotated about a longitudinal axis of the toothbrush body 502 such that the first and second bristles 514, 516 define a varying gap 515 therebetween. The varying gap 515 can have a V-like shape that narrows toward one end, for straddling teeth to be cleaned. In an embodiment, the second head 512 can be angled about the longitudinal axis of the toothbrush body 502 at an angle C of between about 20 degrees and about 60 degrees, or between about 30 degrees and about 50 degrees (e.g., about 45 degrees) relative to the first head 506 to form the varying gap 515. This varying gap 515 advantageously can help apply a greater and/or more concentrated cleaning force on the teeth and/or gums where the first and second bristles 514, 516 converge. It also can reduce the degree to which a user must open the mouth to use nubs as discussed above.

It is to be understood that not necessarily all objects or advantages may be achieved under any embodiment of the disclosure. Those skilled in the art will recognize that the oral cleaning system may be embodied or carried out in a manner that achieves or optimizes one advantage or group of advantages as taught herein without necessarily achieving other objects or advantages as may be taught or suggested herein.

The skilled artisan will recognize the interchangeability of various disclosed features. In addition to the variations described herein, other known equivalents for each feature can be mixed and matched by one of skill in this art to construct an oral cleaning system in accordance with principles of the present disclosure.

The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. An oral cleaning system comprising:
   a toothbrush body including:
   a first stem having a first head with a first plurality of bristles and a rigid configuration, the first stem defining a channel therein and the first head defining at least one fluid outlet in fluid communication with the channel and configured to facilitate irrigation of a mouth or teeth via the first head; and
   a second stem connected to the first stem and extending upwardly and outwardly from a distal portion of the first stem to a second head with a second plurality of bristles, the second head being generally opposed and spaced from the first head, wherein the second stem has a semi-flexible configuration such that the second head is resiliently movable inwardly or outwardly relative to the first head without substantially bending the first stem.

2. The oral cleaning system of claim 1, wherein the first stem is substantially straight and the second stem is curved.

3. The oral cleaning system of claim 2, wherein a fluid inlet is defined in a bottom of the first stem, and the channel fluidly connects the fluid inlet and the at least one fluid outlet.

4. The oral cleaning system of claim 3, wherein the channel has a varying diameter.

5. The oral cleaning system of claim 4, wherein the varying diameter tapers in a direction toward the at least one fluid outlet.

6. The oral cleaning system of claim 3, wherein a fitting is located at or near the bottom of the first stem, the fitting being configured to couple the toothbrush body to a pressurized fluid source.

7. The oral cleaning system of claim 3, wherein the at least one fluid outlet is located below the first bristles on the first head.

8. The oral cleaning system of claim 1, wherein a plurality of nubs is located on a back face of the first head opposite the first bristles, the nubs configured to clean a chewing surface of one or more teeth.

9. The oral cleaning system of claim 1, wherein the second head is configured to move between about 2 mm and about 4 mm inwardly toward to the first head.

10. The oral cleaning system of claim 1, wherein the first stem is removably attached to the second stem and interchangeable.

11. The oral cleaning system of claim 1, wherein the first stem is removably attached to the second stem via a collar member.

12. The oral cleaning system of claim 11, wherein the collar member is integrally formed with the first stem.

13. The oral cleaning system of claim 12, wherein the collar member forms a torsional lock between the first stem and the second stem.

14. The oral cleaning system of claim 13, wherein the torsional lock comprises nesting octagons.

15. The oral cleaning system of claim 12, wherein the collar member forms a snap joint between the first stem and the second stem.

16. An oral cleaning system comprising:
 a toothbrush body including:
  a first stem having a first head with a first plurality of bristles and a rigid configuration, the first stem defining a fluid inlet in a bottom thereof and a channel therein fluidly connecting the fluid inlet and at least one fluid outlet defined in the first head, the at least one fluid outlet configured to facilitate irrigation of a mouth or teeth via the first head; and
  a second stem connected to the first stem and extending upwardly and outwardly from a distal portion of the first stem to a second head with a second plurality of bristles, the second head being generally opposed and spaced from the first head, wherein the second stem has a semi-flexible configuration such that the second head is resiliently movable inwardly or outwardly relative to the first head without substantially bending the first stem.

17. The oral cleaning system of claim 16, wherein the first stem is substantially straight along a longitudinal axis of the first stem and the second stem is curved.

18. The oral cleaning system of claim 16, wherein the second stem is removably attached to the first stem.

19. An oral cleaning system comprising:
 a pressurized fluid source including a supply of fluid; and
 a toothbrush body couplable to the pressurized fluid source, the toothbrush body including:
  a first stem having a rigid configuration and a first head with a first plurality of bristles, the first stem defining a fluid inlet in a bottom thereof for receiving the fluid from the pressurized fluid source, a channel fluidly connecting the fluid inlet, and at least one fluid outlet defined in the first head configured to form at least one fluid jet with the fluid exiting the first head; and
  a second stem connected to the first stem and extending upwardly and outwardly from a distal portion of the first stem to a second head with a second plurality of bristles, the second head being generally opposed and spaced from the first head, wherein the second stem has a semi-flexible configuration such that the second head is resiliently movable inwardly or outwardly relative to the first head without substantially bending the first stem.

20. The oral cleaning system of claim 19, wherein the first stem is substantially straight and the second stem is curved.

\* \* \* \* \*